(12) United States Patent
Park et al.

(10) Patent No.: US 6,829,024 B2
(45) Date of Patent: Dec. 7, 2004

(54) LIQUID CRYSTAL DISPLAY HAVING A REFLECTIVE ELECTRODE AND METHOD FOR FABRICATING THE SAME

(75) Inventors: Young Il Park, Kyoungki-do (KR); Dong Hae Suh, Daegu (KR); Jai Wan Koh, Kyoungki-do (KR)

(73) Assignee: Boe-Hydis Technology Co., Ltd., Kyoungki-do (KR); .

( * ) Notice: Subject to any disclaimer, the term of this patent is extended or adjusted under 35 U.S.C. 154(b) by 46 days.

(21) Appl. No.: 10/317,721

(22) Filed: Dec. 12, 2002

(65) Prior Publication Data

US 2003/0142254 A1 Jul. 31, 2003

(30) Foreign Application Priority Data

Dec. 31, 2001 (KR) .................... 10-2001-89260

(51) Int. Cl.[7] ............... G02F 1/136; G02F 1/1335; G02F 1/13
(52) U.S. Cl. ............... 349/113; 349/43; 349/187
(58) Field of Search ............... 349/113, 187, 349/43; 430/20

(56) References Cited

U.S. PATENT DOCUMENTS

| | | |
|---|---|---|
| 5,508,832 A | 4/1996 | Shimada |
| 5,530,573 A | 6/1996 | Shimada |
| 5,825,448 A | 10/1998 | Bos et al. |
| 6,051,639 A | 4/2000 | Mehl et al. |
| 6,081,310 A * | 6/2000 | Katsuya et al. ............ 349/113 |
| 6,097,459 A * | 8/2000 | Shimada et al. ............ 349/113 |
| 6,172,728 B1 * | 1/2001 | Hiraishi ............ 349/139 |
| 6,175,398 B1 | 1/2001 | Yamada et al. |
| 6,277,451 B1 | 8/2001 | Mehl et al. |
| 6,292,296 B1 | 9/2001 | Choi et al. |
| 6,509,942 B2 * | 1/2003 | Tanaka et al. ............ 349/113 |
| 6,545,735 B1 * | 4/2003 | Koide et al. ............ 349/113 |

* cited by examiner

*Primary Examiner*—Huyen Ngo
(74) *Attorney, Agent, or Firm*—Ladas & Parry LLP

(57) ABSTRACT

The present invention relates to a reflective liquid crystal display and a fabricating method thereof. The reflective liquid crystal display of the present invention comprises a gate formed on a transparent substrate; an insulating film formed on a transparent electrode including the gate; an amorphous silicon layer pattern, an ohmic layer pattern and a source/drain region deposited on the insulating film; a resin layer which is formed on the entire structure including the source/drain region such a manner that the drain region is partially exposed through the resin layer; a first reflective electrode formed on the resin layer including the drain region; and a second reflective electrode of an uneven shape formed on the first reflective electrode.

9 Claims, 3 Drawing Sheets

(a)

(b)

(a)

(b)

LIQUID CRYSTAL DISPLAY HAVING A REFLECTIVE ELECTRODE AND METHOD FOR FABRICATING THE SAME

BACKGROUND OF THE INVENTION

1. Field of the Invention

The present invention relates to a reflective liquid crystal display and a fabricating method thereof. More particularly, the present invention relates to a reflective liquid crystal display and a method for fabricating the same, which allows a fabricating process to be simple by eliminating a rubbing process as used in the prior method while maintaining an uneven surface design for increasing reflectance during the fabricating process.

2. Description of the Prior Art

A method for fabricating a liquid crystal display according to the prior art will now be described with reference to FIG. 1.

FIG. 1 is a cross-sectional view for describing a reflective crystal display according to the prior art and a fabricating method thereof, which shows an array substrate structure formed by means of transmissive four masks.

As shown in FIG. 1, in fabricating the array substrate structure of the liquid crystal display according to the prior art, a gate 13 is first formed on a transparent substrate 11 by a first mask process. Then, an insulating film 15 made of $SiN_x$ is formed on the transparent substrate 11 including the gate 13.

Thereafter, an amorphous silicon layer (not shown), an ohmic layer (not shown) and a conducting layer (not shown) for forming a source/drain region are deposited on the insulating film 15, and successively patterned by a second mask process to form an amorphous silicon layer pattern 17, an ohmic layer pattern 19, a source/drain region 21 and a channel region.

Next, a protective film 23 is deposited on the entire structure and selectively patterned by a third mask process so as to expose the drain 21.

Then, ITO is deposited on the entire structure including the exposed drain 21 and patterned by a fourth mask process to form a pixel electrode 25.

In a general liquid crystal display comprising this array substrate structure, liquid crystal molecules are sandwiched between two transparent substrates, and polarizing plates are attached on the outer sides of substrates, reflectively. Thus, the arrangement of the liquid crystal molecules are changed depending on electrical signals inputted to the transparent electrode disposed between the liquid crystal layer and each of the two substrates, such that the polarizing direction of light passed through the polarizing plates can be controlled, and the passage and blocking of light can be controlled.

In a TN mode display among the prior liquid crystal displays, the liquid crystal molecules sandwiched between the upper and lower electrode plates parallel to each other are aligned under application of an electric field. At this time, since there is no compensation effect for the optical anisotropy of liquid crystal molecules, a narrow viewing angle becomes a great problem.

In an attempt to solve this problem of the narrow viewing angle, there was proposed a method in which a WV film as a compensation film is attached. However, this method has the problem of increased costs.

Moreover, in the liquid crystal mode, liquid crystal molecules aligned with respect to the direction of an electrical field is applied. In this case, the alignment degeneracy occurs in which the liquid crystal molecules are aligned in the right and left sides with respect to the electric field.

As a result, a characteristic of slow response time occurs, and disclination lines are produced so as to deteriorate image quality.

To improve these problems, it is a general method to control the alignment of the liquid crystal molecules by an initial rubbing process. However, the rubbing process has problems in that it can cause many factors associated with poor products, including static electricity and dust.

SUMMARY OF THE INVENTION

Accordingly, the present invention has been made to solve the above-mentioned problems occurring in the prior art, and an object of the present invention is to provide a reflective liquid crystal display and a method of fabricating the same, which allows a fabricating process to be simple by eliminating a rubbing process as used in the prior method while maintaining an uneven surface design for increasing reflectance during the fabricating process.

Another object of the present invention is to a reflective liquid crystal display device and a method of fabricating the same, which permits omitting the rubbing process so that the alignment degeneracy of liquid crystal molecules is prevented, contrast ratio is increased, and viewing angle, luminance and response time are improved.

To achieve the above objects, in one aspect, the present invention provides a reflective liquid crystal display which comprises a gate formed on a transparent substrate, an insulating film formed on a transparent electrode including the gate, and an amorphous silicon layer pattern, an ohmic layer pattern and a source/drain region deposited on the insulating film, the reflective liquid crystal display further comprising a resin layer which is formed on the entire structure including the source/drain region, in such a manner that the drain region is partially exposed; a first reflective electrode formed on the resin layer including the drain region, and a second reflective electrode of an uneven shape formed on the first reflective electrode.

In another aspect, the present invention provides a method of fabricating a reflective liquid crystal display comprising the steps of: forming a gate on a transparent insulating substrate; forming an insulating film on a transparent electrode including the gate; and forming an amorphous silicon layer pattern, an ohmic layer pattern and a source/drain region on the insulating film, the method further comprising the steps of: forming a resin layer on the entire structure including the source/drain region; forming a contact hole in the resin layer in such a manner that the drain region is exposed through the contact hole; forming a first reflective electrode on the resin layer including the drain region; and forming a second reflective electrode of an uneven shape on the first reflective electrode.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The reflective liquid crystal display and the fabricating method thereof according to the present invention will hereinafter be described in further detail with reference to the accompanying drawings.

Figure 1:
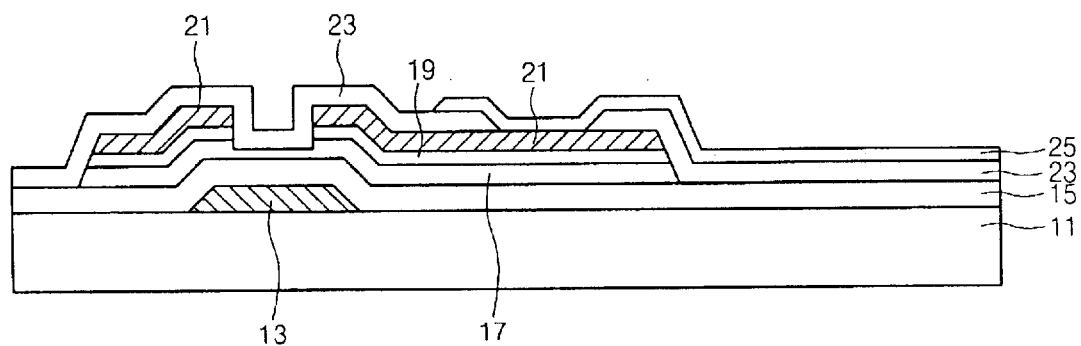
FIG. 1 is a cross-sectional view for describing a reflective crystal display and a fabricating method thereof according to the prior art, which shows an array substrate structure formed using transmissive four masks.
Figure 2:
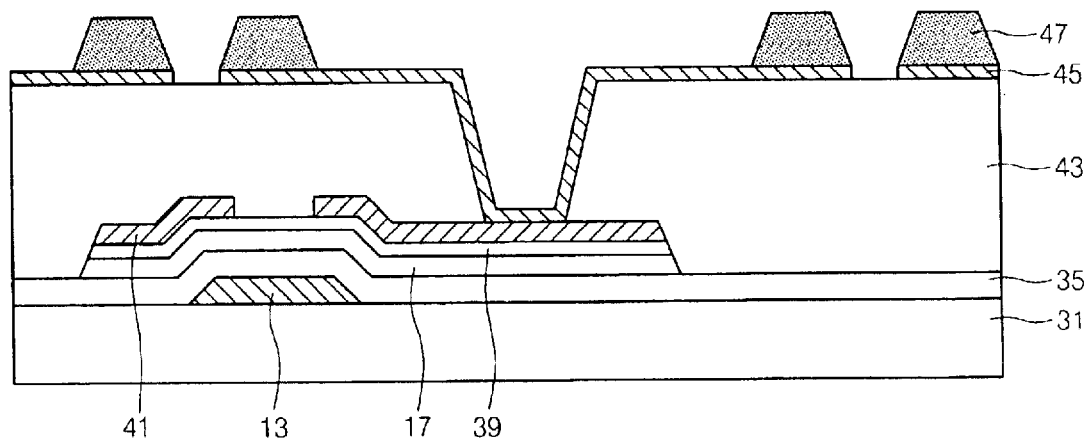
FIG. 2 is a cross-sectional view for describing the reflective liquid crystal display and the fabricating method thereof according to the present invention, which illustrates an array substrate structure formed by adding a mask of a reflective uneven structure to the array substrate structure of FIG. 1 formed using the transmissive four masks.

FIG. 2 is a cross-sectional view for describing the reflective liquid crystal display and the fabricating method thereof according to the present invention, which illustrates an array substrate structure formed by adding a mask of a reflective uneven structure to the array substrate structure of FIG. 1 formed by means of the transmissive 4 masks.

As shown in FIG. 2, the array substrate structure used in the fabricating method of the liquid crystal display according to the present invention is the same as that of FIG. 1 except for portions formed after a step for forming a source/drain region 43.

In brief, a gate 33 is first formed on a transparent substrate 31 by a first mask process, and an insulating film 35 made of $SiN_x$ is formed on the transparent substrate 31 including the gate 33.

Thereafter, an amorphous silicon layer (not shown), an ohmic layer (not shown) and a conducting layer (not shown) for forming a source/drain region are deposited on the insulating film 35 by a second mask process and then successively patterned so as to form an amorphous silicon layer pattern 37, an ohmic layer pattern 39, a source/drain region 41 and a channel region.

Next, a thick acrylic resin layer 43 is formed on the entire structure including the source/drain 41, and selectively patterned by a third mask process such that the drain region 41 is partially exposed.

After this, a first reflective electrode 45 is formed on the entire structure including the portion of the drain 41, and selectively patterned by a fourth mask process.

Then, on the first reflective electrode 45, a second reflective electrode 47 of an uneven shape is formed by a fifth mask process using a half-tone manner. At this time, in order to increase reflectance and to improve process characteristics, the second reflective electrode 47 of the uneven shape is formed of AlNd, Mo/Al, Ti/Al/Ti, Cu, Cr/Al, ITO/Mo/Al or Al/Mo/Al other than Al alone. Moreover, the second reflective electrode 47 of the uneven shape can be formed in a square or zigzag shape.

Furthermore, the second reflective electrode 47 of the uneven shape can be 3 to 48 µm in size (width) and less than 2 µm in height and formed in a shape as shown in FIG. 2.

In addition, the second reflective electrode 47 can be formed in a conical shape or a shape of a semi-elliptical sphere depending on baking temperature. If the baking is conducted at less than 100° C., the electrode 47 is then formed in the conical shape, whereas if it is conducted at more than 100° C., the electrode 47 is then formed in the shape of the semi-elliptical sphere.

Meanwhile, the uneven reflective electrode 47 can be formed in a mixed shape of a negative uneven shape and a positive uneven shape.

As long as the arrangement of liquid crystal molecules surrounding the uneven reflective electrode 47 is uniform, there will be no disclination lines. Rather, the compensation effect for the optical anisotropy of liquid crystal molecules caused by the electric field distortion occurs surrounding the uneven reflective electrode formed to have a desired height. Thus, a gain of viewing angle can be obtained using the compensation effect.

After an array substrate having the uneven reflective electrode 47 formed as described above and a color filter substrate are subjected to alignment and assembling processes, liquid crystal molecules are aligned in a vertical alignment (VA) manner. In this case, a negative liquid crystal for a vertical alignment agent is used.

Figure 3:
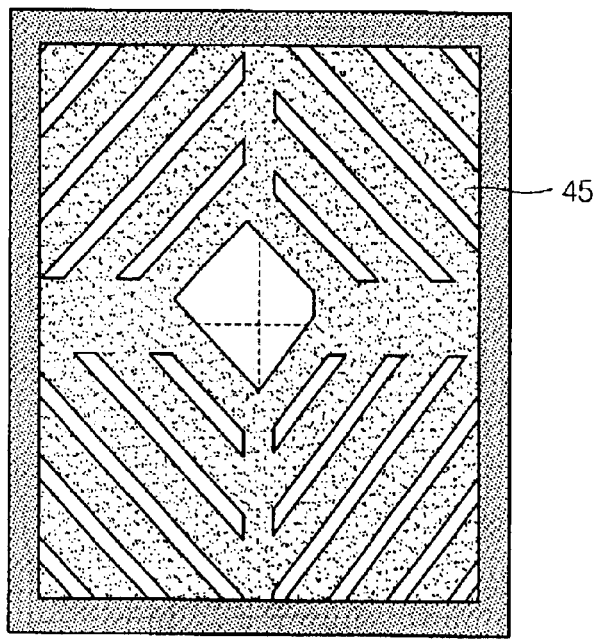
FIG. 3 is a top view of pixel electrodes formed by a reflective five-mask process, in which a shows a four-domain pixel structure, and b shows a two-domain pixel structure.
Figure 3:
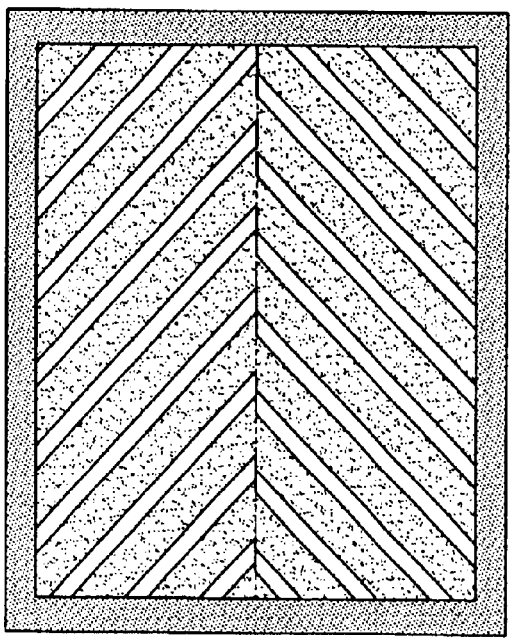

Meanwhile, FIG. 3 is a top view of pixel electrodes formed by the reflective five-mask process according to the present invention. In FIG. 3, a shows a four-domain pixel structure and b shows a two-domain pixel structure.

Figure 4:
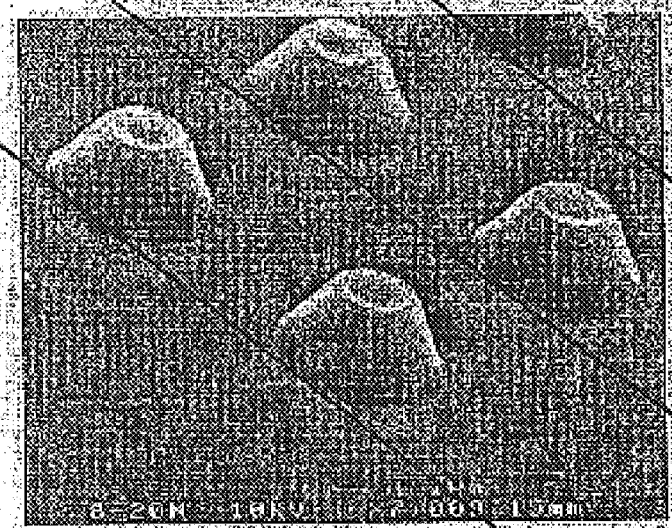
FIG. 4 illustrates a method for the arrangement of uneven reflective electrodes in a reflective liquid crystal display of the present invention, in which a is the case where the uneven reflective electrodes are arranged in a rhombic shape and b is the case where the uneven reflective electrodes are arranged in a square shape.
Figure 4:
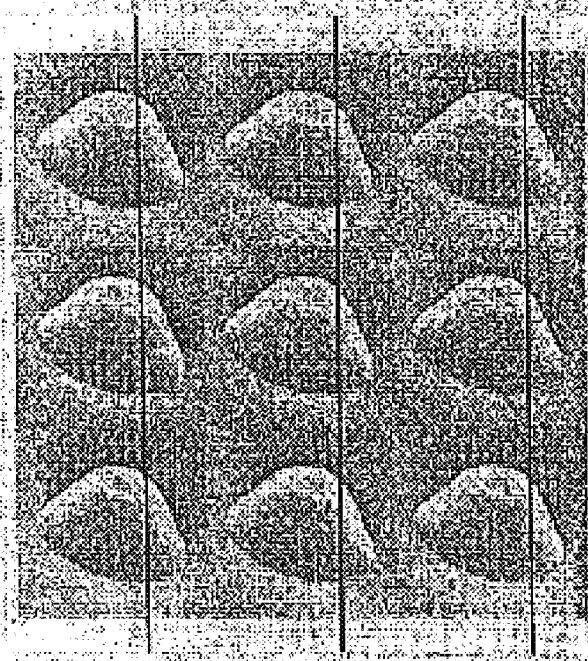

Furthermore, FIG. 4 illustrates a method for the arrangement of the uneven reflective electrode in the reflective liquid crystal device according to the present invention. In FIG. 4, a is the case where the uneven reflective electrodes are arranged in a rhombic shape, and b is the case where the uneven reflective electrodes are arranged in a square shape.

As apparent from the foregoing, according to the reflective liquid crystal display and the fabricating method thereof of the present invention, the first reflective electrode and the second reflective electrode of the uneven shape are formed in the array substrate. As a result, the electric field distortion and thus the alignment degeneracy of the liquid crystal molecules are prevented. Also, contrast ratio can be increased, and viewing angle, luminance and response time can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. In a reflective liquid crystal display comprising gate electrode formed on a transparent substrate, an insulating film formed on the gate electrode, and an amorphous silicon layer pattern, an ohmic layer pattern and a source/drain region deposited on the insulating film, the improvement comprising: a resin layer which is formed on the entire structure including the source/drain region such a manner that the drain region is partially exposed through the resin layer; a first reflective electrode formed on the resin layer including the drain region; and a second reflective electrode less than 2 µm in height and having an uneven shape formed on the first reflective electrode in discrete portions separated from each other.

2. The reflective liquid crystal display of claim 1, wherein the second reflective electrode of the uneven shape is formed of one selected from the group consisting of Cr/Al, AlNd, Mo/Al, Al/Mo/Al, Ti/Al/Ti, Cu and ITO/Mo/Al.

3. The reflective liquid crystal display of claim 1, wherein the second reflective electrode of the uneven shape is formed in a square shape, a zigzag shape, a conical shape, or a shape of a semi-elliptical sphere.

4. In a reflective liquid crystal display comprising a gate electrode formed on a transparent substrate, an insulating film formed on the gate electrode, and an amorphous silicon layer pattern, an ohmic layer pattern and a source/drain region deposited on the insulating film, the improvement comprising:

a resin layer which is formed on the entire structure including the source/drain region in such a manner that the drain region is partially exposed through the resin layer; a first reflective electrode formed on the resin layer including over the drain region; and a second reflective electrode having an uneven shape formed on the first reflective electrode, wherein the second reflective electrode has an uneven shape and has dimensions in a range of from about 3 to 48 $\mu$m in size and less than 2 $\mu$m in height.

5. In a method of fabricating a reflective liquid crystal display comprising the steps of forming a gate electrode on a transparent insulating substrate; forming an insulating film on the gate electrode, and forming an amorphous silicon layer pattern, ohmic layer pattern and a source/drain region on the insulating film, the improvement comprising the steps of: forming a resin layer on the entire structure including the source/drain region; forming a contact hole in the resin layer in such a manner that the drain region is partially exposed through the contact hole; forming a first reflective electrode on the resin layer including the drain region; and forming a second reflective electrode to a height less than 2 $\mu$m and having an uneven shape on the first reflective electrode indiscrete portions separated from each other.

6. The method of claim 5, wherein the second reflective electrode of having uneven shape is formed of one material selected from the group consisting of Cr/Al, AlNd, Mo/Al, Al/Mo/Al, Ti/Al/Ti, Cu and ITO/Mo/Al.

7. The method of claim 5, wherein the second reflective electrode having uneven shape is 3 to 48 $\mu$m in size.

8. The method of claim 5, wherein the second reflective electrode having uneven shape is formed by a mask process using a half-tone.

9. The method of claim 5, wherein the second reflective electrode having uneven shape is formed having a mixed shape of a negative uneven shape and a positive uneven shape.

* * * * *